United States Patent
Riedel (10) Patent No.: US 9,821,456 B2
(45) Date of Patent: Nov. 21, 2017

(54) METHOD FOR THE MANIPULATION OF OBJECTS BY MEANS OF AT LEAST TWO INDUSTRIAL ROBOTS, AND ASSOCIATED INDUSTRIAL ROBOT

(71) Applicant: KUKA Laboratories GmbH, Augsburg (DE)

(72) Inventor: Martin Riedel, Augsburg (DE)

(73) Assignee: KUKA Roboter GmbH, Augsburg (DE)

( * ) Notice: Subject to any disclaimer, the term of this patent is extended or adjusted under 35 U.S.C. 154(b) by 0 days.

(21) Appl. No.: 14/508,177

(22) Filed: Oct. 7, 2014

(65) Prior Publication Data

US 2015/0104284 A1  Apr. 16, 2015

(30) Foreign Application Priority Data

Oct. 15, 2013 (DE) .................... 10 2013 220 798

(51) Int. Cl.
*G06F 19/00* (2011.01)
*B25J 9/00* (2006.01)
(Continued)

(52) U.S. Cl.
CPC ............ *B25J 9/0087* (2013.01); *B25J 9/009* (2013.01); *B25J 9/1682* (2013.01); *B25J 15/00* (2013.01); *G05B 2219/39109* (2013.01)

(58) Field of Classification Search
CPC ..... B25J 15/00; B25J 9/00; B25J 9/009; B25J 9/0087; B25J 9/1682; B25J 9/0084;
(Continued)

(56) References Cited

U.S. PATENT DOCUMENTS 4,260,941 A * 4/1981 Engelberger .......... B23P 21/002
                                                  318/568.13
4,826,392 A * 5/1989 Hayati ................... B25J 9/0084
                                                  318/625
(Continued)

FOREIGN PATENT DOCUMENTS

CN        1117411 A     2/1996
CN      102317042 A     1/2012
(Continued)

OTHER PUBLICATIONS

European Patent Office; Search Report in European Patent Application No. 14187513.8 dated Feb. 26, 2015; 6 pages.
(Continued)

*Primary Examiner* — Rachid Bendidi
(74) *Attorney, Agent, or Firm* — Wood Herron & Evans LLP (57) ABSTRACT

An industrial robot and method for manipulating objects using at least two industrial robots. Each robot includes a manipulator arm having multiple links arranged one after another in series and connected by adjustable joints that are adjustable under the control of at least one control device. A first manipulator arm has a first end link, and at least one second manipulator arm has a second end link. The method includes gripping the object using the first manipulator arm such that the object is connected to the first end link, and coupling a link of the at least one second manipulator arm to a link of the first manipulator arm.

9 Claims, 6 Drawing Sheets

(51) Int. Cl.
    *B25J 15/00* (2006.01)
    *B25J 9/16* (2006.01)

(58) Field of Classification Search
    CPC .......... G05B 2219/39109; G05B 2219/40281;
        G05B 2219/39128; G05B 2219/36432;
        G05B 2219/36433; G05B 2219/39121;
        G05B 2219/39122; G05B 2219/38124;
        G05B 19/41815; C07K 14/195
    USPC ................................................ 700/245–264
    See application file for complete search history.

(56) References Cited

U.S. PATENT DOCUMENTS

| | | | | |
|---|---|---|---|---|
| 5,086,983 | A * | 2/1992 | Darrieux | B65H 81/04 |
| | | | | 242/434.5 |
| 5,254,923 | A * | 10/1993 | Kanitani | B25J 9/009 |
| | | | | 318/568.11 |
| 5,353,386 | A * | 10/1994 | Kasagami | B25J 9/1682 |
| | | | | 700/247 |
| 9,329,593 | B2 * | 5/2016 | Izumi | G05B 19/41815 |
| 2004/0029129 | A1 * | 2/2004 | Wang | C07K 14/195 |
| | | | | 435/6.18 |
| 2005/0036879 | A1 * | 2/2005 | Jhaveri | B25J 9/0084 |
| | | | | 414/751.1 |
| 2005/0055132 | A1 * | 3/2005 | Matsumoto | B25J 9/1682 |
| | | | | 700/245 |
| 2005/0273198 | A1 * | 12/2005 | Bischoff | B25J 9/1682 |
| | | | | 700/248 |
| 2010/0300230 | A1 * | 12/2010 | Helmer | B25J 9/106 |
| | | | | 74/469 |
| 2013/0079928 | A1 | 3/2013 | Soe-Knudsen et al. | |
| 2013/0110290 | A1 | 5/2013 | Geffard et al. | |
| 2014/0106386 | A1 * | 4/2014 | Umeno | G01N 35/0099 |
| | | | | 435/23 |

FOREIGN PATENT DOCUMENTS

| | | | | |
|---|---|---|---|---|
| CN | 102729257 A | 10/2012 | | |
| DE | WO 2005087451 A1 * | 9/2005 | ............ | B25J 9/009 |
| DE | 102010027280 A1 | 1/2012 | | |
| DE | 102011006992 A1 | 5/2013 | | |
| EP | 2392435 A2 | 12/2011 | | |
| EP | 2396148 A1 | 12/2011 | | |
| EP | 2743040 A2 | 6/2014 | | |
| JP | S5964239 A | 4/1984 | | |
| JP | S6025673 A | 2/1985 | | |
| JP | 2009262302 A | 11/2009 | | |
| JP | 2009262304 A | 11/2009 | | |
| SE | WO 2010091722 A1 * | 8/2010 | ............ | B25J 9/0087 |
| WO | 2010091722 A1 | 8/2010 | | |
| WO | 2012/004017 A1 | 1/2012 | | |

OTHER PUBLICATIONS

German Patent Office; Search Report in German Patent Application No. 10 2013 220 798.0 dated Sep. 3, 2014; 7 pages.
Chinese Patent Office; Office Action in Chinese Patent Application No. 201410539661.1 dated Sep. 28, 2015; 15 pages.
Korean Patent Office; Office Action in Korean Patent Application No. 2014-0138215 dated May 10, 2016; 5 pages.

* cited by examiner

METHOD FOR THE MANIPULATION OF OBJECTS BY MEANS OF AT LEAST TWO INDUSTRIAL ROBOTS, AND ASSOCIATED INDUSTRIAL ROBOT

TECHNICAL FIELD

The invention relates to a method for the manipulation of objects by means of at least two industrial robots which each have a manipulator arm which has multiple links following one after the other, connected by adjustable joints which are adjustable upon the control of at least one control device, wherein the first manipulator arm has a first end link and the at least one other manipulator arm has a second end link. The invention also relates to an associated industrial robot.

BACKGROUND

A method is known from EP 2 392 435 A2 for the manipulation of workpieces by means of cooperating manipulator arms which are controlled by at least one control device, particularly by means of a workpiece manipulation system, having the steps of the manually-guided moving of at least one first manipulator in at least one of its degrees of freedom, and the automated controlling of at least one second manipulator according to the manually-guided manipulator. The workpiece manipulation system in this case has at least two manipulator arms which cooperate to manipulate workpieces, and which are automatically controllable and/or programmable in three or more axes by means of at least one freely programmable control device, wherein at least one first manipulator arm is constructed for the purpose of manually-guided movement in at least one of its degrees of freedom, and the control device is constructed to automatically control at least one second manipulator arm accordingly to the manually-guided manipulator arm.

SUMMARY

The problem addressed by the invention is that of creating a method for the manipulation of objects, and industrial robots constructed for this purpose, which improve performance in the manipulation of objects by means of the industrial robots.

The problem is addressed according to the invention by a method for the manipulation of objects by means of at least two industrial robots which each have a manipulator arm which has multiple links following one after the other, connected by adjustable joints which are adjustable upon the control of at least one control device, wherein the one manipulator arm has a first end link and the at least one other manipulator arm has a second end link, having the following steps:

gripping the object by means of one manipulator arm, in such a manner that the object is connected to the first end link, and coupling one link of the at least one other manipulator arm to one of the links of the first manipulator arm.

Manipulator arms with associated robot controls, particularly industrial robots, are work machines which can be equipped for automatically manipulating and/or processing objects using tools, and can be programmed in multiple axes of movement—for example for orientation, position, and work process. Industrial robots typically have a manipulator arm with multiple links connected via joints, and programmable robot controls (control devices) which automatically control the movement processes of the manipulator arm during the operation thereof. The links are moved via drives, particularly electric drives, which are controlled by the robot control, particularly with respect to the axes of movement of the industrial robot, the same representing the degrees of freedom of movement of the joints. This means that the links are moved by adjusting the joints by means of the electrical drives. Each manipulator arm can be controlled by its own control device. However, the two or more manipulator arms can also be controlled by a common control device.

The at least one other manipulator arm, which can be coupled as a means of support to the first manipulator arm according to any one of the methods according to the invention, can be operated as an independent manipulator arm and/or industrial robot prior to any of the methods according to the invention being carried out, and/or after any of the methods according to the invention being carried out. As such, the methods according to the invention can be carried out in a robot cell of industrial robots, having two or more manipulator arms which are controlled, outside of the methods according to the invention, according to the known methods.

A manipulator arm having multiple links which are connected via joints can be configured as an articulated arm robot with multiple links and joints arranged one after the other in series. In particular, the manipulator arm can be designed as a six-axis articulated arm robot or a seven-axis articulated arm robot.

Manipulator arms with associated robot controls, such as industrial robots, can also be so-called lightweight robots which differ from conventional industrial robots in that they have a constructed size which is advantageous for the human/machine cooperation, and have a relatively high load capacity relative to their own weight. In addition, lightweight robots can particularly be operated with force control rather than position control, which simplifies a manual adjustment of the pose of the manipulator arm, by way of example. In addition, in this way it is possible to achieve a secure human/machine cooperation, because it is possible to prevent or at least to lessen unintentional collisions of the manipulator arm with persons, by way of example, in such a manner that the persons do not receive any injury. Such a manipulator arm and/or such a lightweight robot can have more than six degrees of freedom, such that as a result an overdetermined system is created. In this way, it is possible to reach the same point in space in the same orientation, in multiple different poses of the manipulator arm. The lightweight robot can react in a suitable manner to external applications of force. Force sensors can be used to measure forces, said force sensors being capable of measuring forces and torques in all three spatial dimensions. As an alternative or in addition thereto, the external forces can also be estimated without sensors—for example using the measured motor currents of the drives on the joint of the lightweight robot. By way of example, an indirect force control can be used as the control concept, based on modeling the lightweight robot as a mechanical resistance (impedance), or a direct force control can be used.

The objects which are manipulated by the industrial robots can be workpieces, by way of example, which are intended to be hoisted, held, moved, and/or manipulated in another manner. Moreover, the objects which are manipulated can also be tools which are intended to be guided by the industrial robot—for example to work on a separate workpiece by using this tool, to perform an assembly, and/or to work on the workpiece in another manner.

The end link of a manipulator arm can be a so-called hand adapter, in general, wherein a grip can be attached to the same, by way of example, and can be designed to hold the same. By way of example, in the case of a tool being the object which is manipulated, the tool can be attached directly to the hand adapter, and optionally by means of an attachment device, or alternatively can be held by means of a grip which is attached to the hand adapter.

In the case of one link of the at least one other manipulator arm being coupled according to the invention to one of the links of the first manipulator arm, the term 'links of the first manipulator arm' should be accordingly understood to mean that an endeffector which is fixed to the end link of the manipulator arm, and particularly a grip, can be characterized as a link of the manipulator arm. This particularly relates to a base body of the endeffector and/or the grip which is fixed to—and particularly rigidly connected to—the end link, and particularly a hand adapter of the manipulator arm, in the typical manner, such that these components as such form a single rigid link.

Because, according to the invention, in a method for the manipulation of objects by means of at least two industrial robots, wherein the object is gripped by means of the one manipulator arm in such a manner that the object is connected to the first end link, and one link of the at least one other manipulator arm is coupled to one of the links of the first manipulator arm, it is possible to improve performance in the manipulation of objects as a result of the fact that the at least one other manipulator arm supports the first manipulator arm in its manipulation of the object.

This does not mean that the first manipulator arm and the at least one other manipulator arm manipulate and/or hold the object together, as is the case in cooperating industrial robots, by way of example, wherein a first industrial robot holds the object at a grip position of the object, and a second, and optionally third or further, industrial robot holds the same objects at another grip position of the object. Rather, according to the invention, only the first industrial robot grips the object, and accordingly holds the same, and a second industrial robot, and optionally a third or further industrial robot, supports the manipulation of the object by coupling itself to a link of the first industrial robot without directly gripping the object itself.

A compact design of the joints with internal servo drive and integrated control electronics and sensors has numerous advantages for the operation, but also limits the performance of lightweight robots. This is true most of all for the working load which is deliberately kept low to reduce the potential for harm to an operator during the interaction, for example. However, many applications, particularly in the industrial field, require a higher working load. However, this is most commonly only required temporarily. In this case, for technical and economic reasons, a permanent increase in working capacity is not advantageous. In addition, some applications also require improved kinetostatic properties of the robot in other aspects, such as a higher rigidity for example, in order to be able to work against external process forces without moving in response, or higher precision for highly-precise joining operations [sic].

It is possible to achieve an improvement in performance in the manipulation of objects in cases where lightweight robots are used, above all, by a temporary increase in the working load. As an alternative or in addition to a temporary increase in the working load, however, an increase in the rigidity and/or an improvement in precision can be achieved by one of the methods according to the invention, by way of example.

As such, the object is gripped only via one grip at one grip position, such that it is also possible to manipulate smaller components which exceed the working load of the single robot. Additional regions of the component which would be necessary for placing further grippers in the case of conventional cooperating robots are no longer necessary at this point.

According to the invention, it should be possible to adapt the robot characteristics according to needs, and/or temporarily or specifically for the specific task. Such an adaptation can automatic [sic] in this case, without additional external action—that is, without the need for components on the robot being modified, or potential manual operations performed by the user being necessary. New, modified properties of the robot can be provided by means of the method according to the invention at no cost and/or time investment.

In this case, the construction of the robot can be generally unmodified, such that available series models of industrial robots can be used. This makes it possible to further take advantage of the advantages of a lightweight robot. By way of example, the properties of the hand-guided programming (teaching), and the possibility of direct cooperation between human and robot, can be maintained in this case.

A serial link manipulator arm structure, such as that of a lightweight robot, for example, possesses good movement characteristics, but typically cannot accept high forces due to the long lever extensions. In addition, the working load is reduced in such a serial link structure of the manipulator arm, because the drives which are particularly in a proximal location in the kinematic chain must also support the more distal drives themselves.

The adaptations of the properties, mentioned above, can be realized by a suitable coupling of two or more manipulator arms. The manipulator arm which cannot carry out the task alone is supported by at least one further manipulator arm, in such a manner that this further manipulator arm is directly connected to the first manipulator arm, and forces can be transmitted to this structure. This can be understood to mean that a reconfiguration of the kinematic structure occurs in this case. The serial kinematic chain is extended by additional links in such a manner that closed substrings are created. This newly structured, and as such parallel-kinematic structure, can be produced quickly and according to needs by coupling links of the at least two manipulator arms. The working load and/or the rigidity of this new structure as a whole can be significantly higher than that of the two individual structures. Likewise, the positional precision of the manipulator arm can be increased, because the rotary encoders arranged in the closed substring in a manner which is redundant because of the other manipulator arm can enable an improvement in the measurement precision. If these special properties are not required, the second manipulator arm can once more separate from the first manipulator arm such that they once again form individual serial kinematic chains which can then once more work together separately and individually as before, in the same workspace.

In this case, the object is only guided via one gripper—the gripper of the supported robot—making it possible to manipulate small and compact components. Programs already developed for the automatic planning of grips can continue to be used here.

In addition, there is likewise still the additional possibility of coupling via the workpiece—as in the case of cooperating robots—and this can even be additionally used according to the situation to additionally support the robot linkage itself during a method according to the invention, should this be practical. In this case, the workpiece would need to allow manipulation via multiple grip positions, however.

The structures can be coupled together in principle at any arbitrary links. However, the support can particularly be implemented at one of the distal links of the guiding manipulator arm, for a generally better transmission of force. The additional manipulator arm can particularly use the specific link in its own serial kinematic chain, for supporting the force, which least influences the degree of freedom and the mobility of the guiding manipulator arm which manipulates the object. These are preferably likewise the distal links.

The mechanical connection between the manipulator arms can either be realized by a special coupling element, such as a bolt with a lock, or by the use of a gripper.

In this case, functional surfaces can be configured on the guiding manipulator arm, enabling a quick and defined coupling to one of the links of the other manipulator arm. In both cases, what must be achieved is particularly a positive-fitting construction of the connection, which on the one hand enables a defined orientation of the two manipulator arms, and on the other hand can also transmit large forces.

The link to be coupled, of the at least one other manipulator arm, can be the second end link. In this case, a coupling link, a countercoupling link, or a gripper can be attached to the second end link of the at least one other manipulator arm. Because the link to be coupled is arranged on the second end link, all joints of the at least one other manipulator arm can be used to, by way of example, position the coupling link, the countercoupling link, or the gripper attached to the link to be coupled, with respect to its position and/or orientation in space, such that the link to be coupled can be easily coupled to a desired point of the first manipulator arm in a very flexible and universal manner. Because the link to be coupled is arranged on the second end link, the range in particular is as large as possible, in order to make it possible to achieve a plurality of points on the first manipulator arm by the link to be coupled of the at least one other manipulator arm. As such, it is possible for the first manipulator arm to be coupled to the at least one other manipulator arm in a large number of poses.

The method for manipulating objects can have the further step of:

hoisting the object by the first manipulator arm and the at least one other manipulator arm, together, in such a manner that the at least one other manipulator arm takes over a part of the holding forces via its link coupled to one of the links of the first manipulator arm.

Because the first manipulator arm is coupled to the at least one other manipulator arm, the object can be hoisted by both as a result of the fact that only the first manipulator arm grips the object, and the at least one other manipulator arm takes over a part of the holding forces via its link coupled to one of the links of the first manipulator arm. The at least one other manipulator arm in this case accepts at least a part of the holding forces, because it takes over holding forces from the first manipulator arm, and/or directs forces into the same, via the coupled link which has gripped the object. This means that two or more manipulator arms hold, hoist, and/or lower the object together, but only the first manipulator arm has gripped and/or held the object, while in contrast the further manipulator arm has no direct contact to the object—that is, has not gripped this object with its own grippers. As such, by way of example, it is possible to hold and/or hoist and/or lower in a controlled manner very small but heavy objects, which cannot be gripped by two or more grippers due to their dimensions and the size of the grippers of the manipulator arms due to the available space. Moreover, only the first gripper need be designed in such a manner that it is suitable for gripping the object. The further grippers of the other manipulator arms can be given a conventional design, in contrast, as long as they are suitable and designed to be able to couple to the desired link of the first manipulator arm. This is more easily possible because the size and/or form of the links of the manipulator arms is known from the start, whereas the size and/or form of the objects to be manipulated are generally not known in advance, due to their variety.

The method for manipulating objects can have the further step of:

working on the object by means of another object, or working on another object by means of the object, and the at least one other manipulator arm completely or partially accepting reaction forces and/or reaction torques which are directed into the first manipulator arm as a result of the work, via its link coupled to one of the links of the first manipulator arm.

In such an embodiment of the method, the manipulation of the object consists of a working on the object by means of another object, or working on another object by means of the object. The term 'working' can be, by way of example, the processing of a workpiece by a tool, including drilling, milling, planning, polishing, assembling, etc. In the first alternative, the object can therefore be the workpiece which is held by the first manipulator arm and is worked on by a tool which constitutes the other object. In this case, the first manipulator arm, which grips the workpiece, can either merely hold the workpiece—for example on a work table, such that an external, separate tool can work on the workpiece—or the workpiece gripped by the manipulator arm can approach, and/or be guided along the tool, particularly the fixed tool. In the second alternative, the object can be the tool, which is guided by the manipulator arm and which works on a separately arranged workpiece which in this case constitutes the other object.

The method for manipulating objects can have the further step of:

controlling the joints of the first manipulator arm by means of the at least one control device based on measured values, with respect to the positions of the joints of both the first manipulator arm, and also based on measured values regarding the positions of the joints of the at least one other manipulator arm.

In general, a manipulator arm is controlled in such a manner that the pose it should assume (positions and orientations) are selected by all joints being brought into their respective predetermined positions. This is carried out by the control device accordingly controlling the drives of the manipulator arm in order to adjust the joints, for example based on a robot program or on the inputs given to a programming hand device. So that the desired target positions of the joints can be set, sensors are arranged on the joints, in general, and measure the momentary actual positions of the joints. The values of the actual positions supplied by the sensors cannot be precise to any arbitrary degree. In particular, the values of the actual positions can also include errors, such that the pose which should be assumed can only be approximated with a certain tolerance. At this point, because the method includes a controlling of the joints of the first manipulator arm by means of the at least one control device based on measured values regarding the positions of the joints of both the first manipulator arm and also based on measured values regarding the positions of the joints of the at least one other manipulator arm, it is possible to improve the positional precision of the first manipulator arm. This occurs, in such an embodiment, as a result of the fact that the drives of the first manipulator arm are controlled by the robot control not only based on the values of the actual positions supplied by the sensors of this first manipulator arm, but also additionally because the value of the actual positions of the joints of the coupled, at least one further, manipulator arm are taken into account.

As such, the position and orientation values of the specific link of the first manipulator arm to which the second manipulator arm is coupled can be determined, on the one hand, from the joint angle positions of the joints of the first manipulator arm which are upstream of this coupled link of the first manipulator arm in the kinematic chain, and on the other hand can be determined from the joint angle positions of the joints of the second manipulator arm which are upstream of this coupled link of the second manipulator arm in the kinematic chain. As such, two position and orientation values are redundantly obtained for the link of the first manipulator arm which is directly coupled to the second manipulator arm, which can be compared, wherein more precise values can be determined based on the comparison—for example average values for the actual position and orientation of this link of the first manipulator arm. The coupled link under consideration can particularly have a first tool reference point, particularly a first TCP (tool center point), and the second coupled manipulator arm in this case can have a second tool reference point, particularly a second TCP (tool center point), and a common average value is found for these two position and orientation values. In this way, a redundant forward calculation can be made from the drives to the pose of the tool reference point, because two pieces of information are available on the actual position of the tool reference point, particularly the TCP, thereby enabling a calculation with higher precision of the endeffector pose.

As an alternative or in addition thereto, the position and orientation of the coupling point between the first manipulator arm and the at least one other manipulator arm can be determined in space from the values of the actual positions of the joints of the coupled, at least one further manipulator arm, and based on this position and orientation of the coupling point, the values of the joint positions of the first manipulator arm in the kinematic chain below the coupling point can be back calculated, thereby determining redundant values for the joint positions of the first manipulator arm. In this way, two values for the joint positions of the first manipulator arm are determined for each joint. False values for the same joint which potentially deviate from each other can then be averaged out such that the precision of the determination of the joint positions can be improved. In other words, the at least one other manipulator arm forms a measuring machine which additionally measures the joint positions of the first manipulator arm—in addition to joint value sensors of the first manipulator arm itself.

The link of the at least one other manipulator arm can be coupled to one of the links of the first manipulator arm by a coupling device, which has a first coupling link which has a coupling link which is fixed to the link of the first manipulator arm, and a second countercoupling link which is fixed to the link of the at least one other manipulator arm, wherein said countercoupling link is coupled to the coupling link when the links are coupled.

In a simple design, the coupling device can be a pairing of a bolt which forms the coupling link and a lock which forms the coutercoupling link. In principle, the coupling devices can be coupled and/or locked, by way of example, mechanically, electromechanically, electrically, magnetically, pneumatically, and/or hydraulically. The coupling device can therefore have a generally detachable design. In particular, the coupling device can be controlled, and particularly can be designed to be able to detach and to lock by control by the robot control. In this way, coupling one link of the at least one other manipulator arm to one of the links of the first manipulator arm can be realized automatically by robot program control. However, as an alternative, a coupling can also optionally be performed manually. In both cases, a coupling of each link of the manipulator arm can be automatically detected by sensors, such that the robot control can automatically recognize which of the links of the manipulator arms are coupled at the moment, and which are not coupled. As a result, the robot control can accordingly set up the kinematic coupling and accordingly control the manipulator arm and/or the manipulator arms.

The link of the at least one other manipulator arm can be coupled to one of the links of the first manipulator arm by a gripping device, as an alternative to a coupling device, which is fixed to the link of the at least one other manipulator arm and which grips the link of the first manipulator arm when the links are in the coupled state.

In such an embodiment, the gripping device of the at least one other manipulator arm can be used in an operating mode, on the one hand, to manipulate objects itself, while on the other hand, in another operating mode, it can be used to couple to the first manipulator arm in order to support the same when the first manipulator arm manipulates the object. For this purpose, the gripper can be designed and/or constructed to connect to one link of the first manipulator arm. As an alternative or in addition, the links of the first manipulator arm can be designed in such a manner that they have grip surfaces which can be gripped by a simply designed gripper of the at least one other manipulator arm. As such, in the case of a simple pincher gripper, by way of example, the link and/or the links of the first manipulator arm can have flat surface segments opposite each other where the pincher grippers grip the link from opposite sides, and can clamp the link between their two gripper jaws.

The problem addressed by the invention is also solved by an industrial robot, having a control device and a manipulator arm which has multiple links following one after the other, connected by adjustable joints which can be adjusted by control by the control device, and further having at least one coupling link and/or a countercoupling link which is connected to at least one of the links and which is designed to be in engagement with a corresponding countercoupling link and/or coupling link of the other manipulator arm when the link of the first manipulator arm is coupled to the link of the at least one other manipulator arm, particularly in a coupled state as described, in a method according to the invention.

In such an industrial robot, one, two, more, or all links of the manipulator arm each have one, two, or more coupling links and/or countercoupling links. A coupling device in this regard, particularly the coupling links and/or the countercoupling links, can be designed as described above in greater detail. In this case, in general, one link can have two or more coupling links and/or countercoupling links which are connected to the link, and are particularly attached to the link, oriented in different spatial directions.

Multiple concrete embodiments of industrial robots which can be operated according to the methods according to the invention are explained in greater detail in the following description with reference to the attached figures. Concrete features of this embodiment can constitute general features

DETAILED DESCRIPTION

Figure 1:
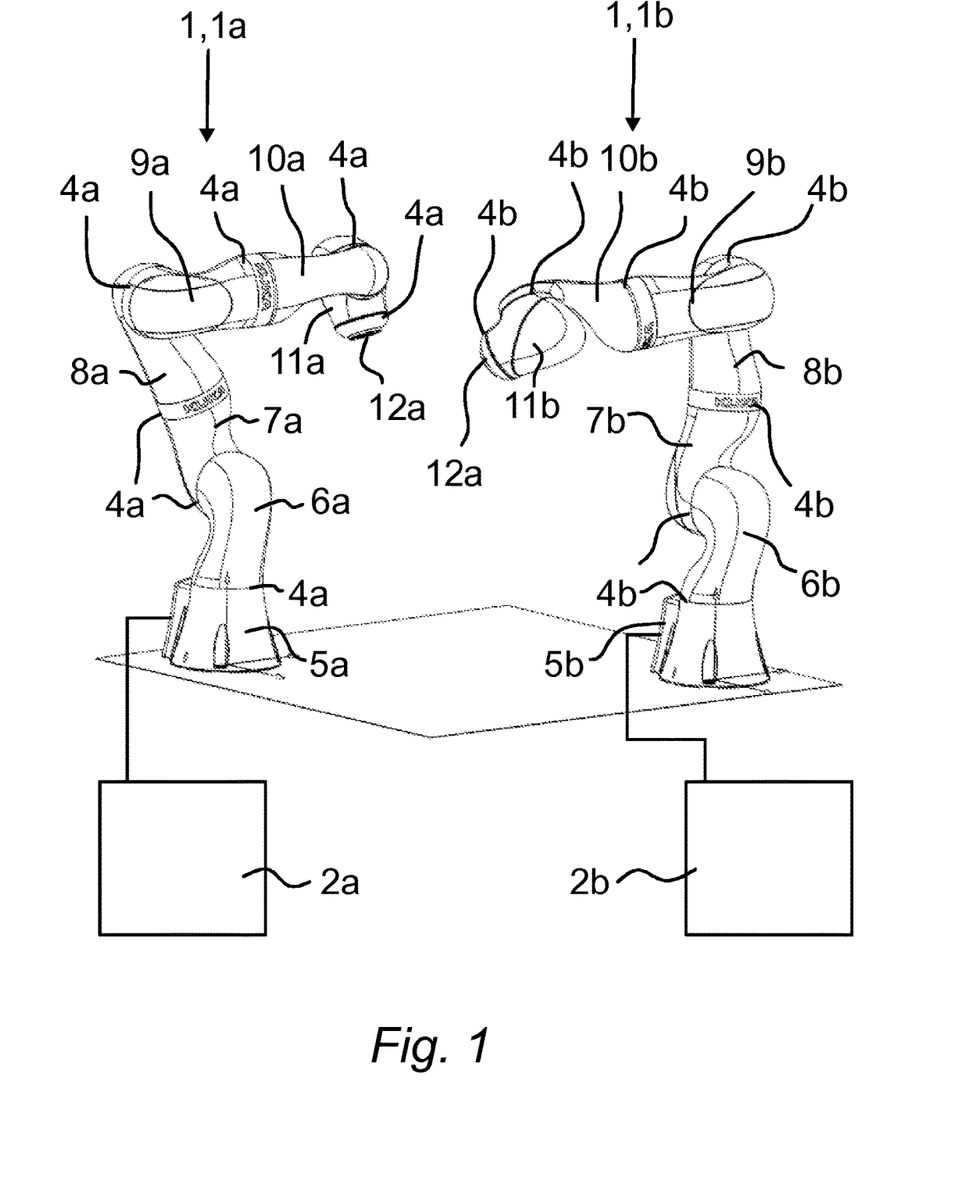
FIG. 1 shows a perspective view of an exemplary robotic workspace, with two manipulator arms.

FIG. 1 shows an exemplary robotic workspace with two manipulator arms 1a, b of two industrial robots 1. Each of the industrial robots 1 in the exemplary design is constructed as a so-called lightweight robot of the KUKA LBR type, having a manipulator arm 1a, 1b and one robot control 2a, 2b associated with each of the same. Each manipulator arm 1a, 1b has, in the case of the present embodiment, multiple links 5a, 5b to 12a, 12b arranged one after the other and connected to each other by means of seven joints 4a, 4b in a manner allowing rotation.

The robot controls 2a, 2b of the industrial robots 1 are designed and/or constructed to execute a robot program, by means of which the joints 4a, 4b of each manipulator arm 1a, 1b can be automated according to the respective robot program, or can be adjusted and/or rotated automatically in a hand-guidance mode. For this purpose, the robot controls 2a, 2b are connected to controllable electric drives which are designed to adjust the joints 4a, 4b of the associated manipulator arm 1a, 1b.

The robot controls 2a, 2b are designed and/or constructed to carry out the method for manipulating objects 13 as is described in greater detail below with reference to multiple concrete embodiments.

Figure 2A:
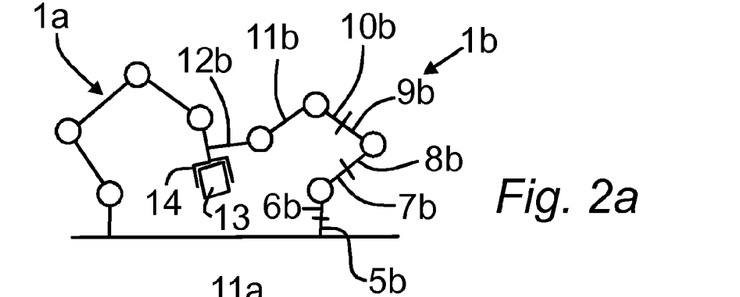
FIG. 2a shows a schematic illustration of two manipulator arms, wherein one end link of the second manipulator arm is coupled to the end link of the first manipulator arm.

A series of different types of couplings according to the invention is schematically illustrated in an exemplary manner in FIGS. 2a to 2e. The illustrated variants are not exclusive of each other. Rather, depending on the application, combinations of link pairs which are not illustrated can also be coupled. FIG. 2a depicts a method for the manipulation of objects 13 by means of, by way of example, at least two industrial robots 1 which each have a manipulator arm 1a, 1b which has multiple links 5a, 5b to 12a, 12b following one after the other, connected by adjustable joints 4a, 4b. The joints 4a, 4b can be adjusted by control by the two control devices 2a, 2b (FIG. 1). The first manipulator arm 1a has a first end link 12a and the second manipulator arm 1b has a second end link 12b.

In all of the exemplary illustrated variants, the object 13 is gripped by means of the first manipulator arm 1a. The gripping is such that the object 13 is connected to the first end link 12a by a gripper 14. The second manipulator arm 1b need not necessarily have its own gripper 15, as is shown in FIGS. 2a to 2d. In any case, as is shown in FIG. 2e, the manipulator arm 1b can also have its own gripper 15 if needed. As is shown later in FIGS. 5a to 6c, this is also so that it is possible to make a coupling to a link 5a to 12a of the first manipulator arm 1a by means of the second gripper 15.

In the case illustrated in FIGS. 2a to 2d, the link to be coupled, of the at least one other manipulator arm, therefore constitutes the second end link 12b in the embodiment of the second manipulator arm 1b as such. In the case of FIG. 2e, the link to be coupled, of the at least one other manipulator arm, therefore does not constitute the second end link 12b in the embodiment of the second manipulator arm 1b as such, but rather the link 11b does—representative for any other link 5b to 11b of the second manipulator arm 1b.

In FIG. 2a, the end link 12b of the second manipulator arm 1b couples to the end link 12a of the first manipulator arm 1a. In this way, by way of example, holding forces and/or reaction forces can be accepted very close to the object 13 by the second manipulator arm 1b, without the second manipulator arm 1b needing to grip the object 13 itself. As such, the manipulator arm 1b does not need a special gripper which would need to be designed for the purpose of grasping the object 13. In a configuration where the second manipulator arm 1b supports the first manipulator arm 1a, a coupling of the second manipulator arm 1b to the end link 12a of the first manipulator arm 1a is reasonable to make it possible to redundantly detect the joint angle positions of the first manipulator arm 1a. This is because all joint angle positions of the joints 4a of the first manipulator arm 1a can then be back-calculated.

Figure 2B:
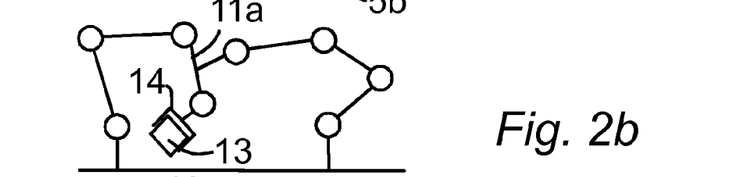
FIG. 2b shows a schematic illustration of two manipulator arms, wherein the end link of the second manipulator arm is coupled to a distal link of the first manipulator arm.

In FIG. 2b, the end link 12b of the second manipulator arm 1b does not couple to the end link 12a of the first manipulator arm 1a, but rather to the previous link 11a. In this way, although it is not possible to detect and/or back-calculate the complete kinematic chain of the first manipulator arm 1a, it is still possible for holding forces and/or reaction forces to be accepted very close to the object 13, but at a certain distance from the object 13. This can be reasonable if, by way of example, the object 13 is bulky and/or very long in such a manner that the second manipulator arm 1b cannot approach sufficiently close, and particularly can potentially not reach the end link 12a of the first manipulator arm 1a. In addition, a pulling performed by the second manipulator arm 1b, by way of example, in a direction which is oriented opposite the orientation of the object 13 and/or the end link 12a of the first manipulator arm 1a, can be desired.

Figure 2C:
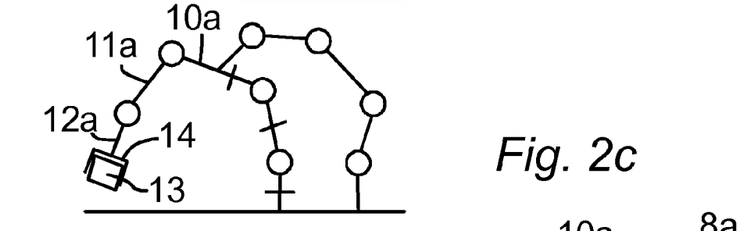
FIG. 2c shows a schematic illustration of two manipulator arms, wherein the end link of the second manipulator arm is coupled to another link of the first manipulator arm.

In FIG. 2c, the end link 12b of the second manipulator arm 1b couples to a central link 10a. In this way, loads are removed from, by way of example, the base axes—meaning joints 4b between the links 5a to 9a.

Figure 2D:
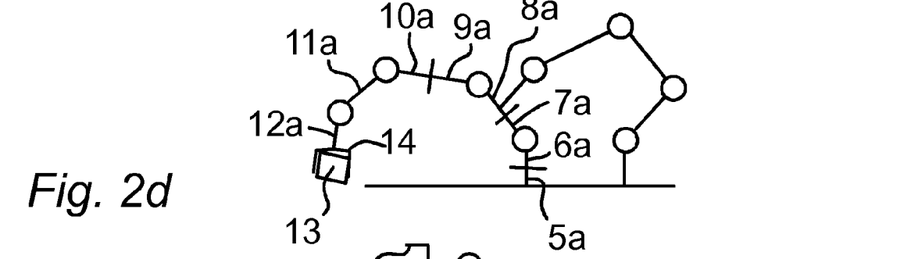
FIG. 2d shows a schematic illustration of two manipulator arms, wherein the end link of the second manipulator arm is coupled to a proximal link of the first manipulator arm.
Figure 2E:
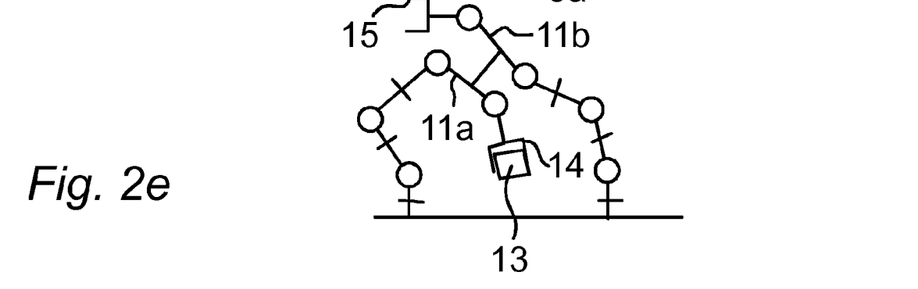
FIG. 2e shows a schematic illustration of two manipulator arms, wherein one link of the second manipulator arm which is not the end link is coupled to a link of the first manipulator arm.

In FIG. 2d, the end link 12b of the second manipulator arm 1b couples to the link 8a. In this way, loads are particularly removed from, by way of example, the base axes—meaning joints 4b between the links 5a to 8a. This can be practical, by way of example, if the first manipulator arm 1a is operating at the limits of its workspace, with the result that the base axes—meaning joints 4b between the links 5a to 8a-bear particularly strong forces and/or torques.

In FIG. 2e, the end link 12b of the second manipulator arm 1b is not coupled. Rather, a central link 11b of the second manipulator arm 1b is coupled to a central link 11a of the first manipulator arm 1a. The coupling of the link 11b, illustrated in FIG. 2e, to the link 11a is only a representative example for every other link pairing of the first manipulator arm 1a and the second manipulator arm 1b, wherein the end link 12b of the second manipulator arm 1b remains free. Then, by way of example, the gripper 15 can be arranged on this free end link 12b, and is not involved in the present coupling configuration. This can be the case, by way of example, if the gripper 15 is large and particularly bulky, and is mounted on the second manipulator arm 1b for other manipulation purposes and unable to perform the gripping of links 5a to 12a of the first manipulator arm 1a itself. Such a formation of closed substrings can limit or block the movement of the first manipulator arm 1a in certain degrees of freedom, depending on the choice of the partner being coupled. This can be exploited, by way of example, to fix the manipulator arm 1a with high rigidity up to the coupled link.

Figure 3A:
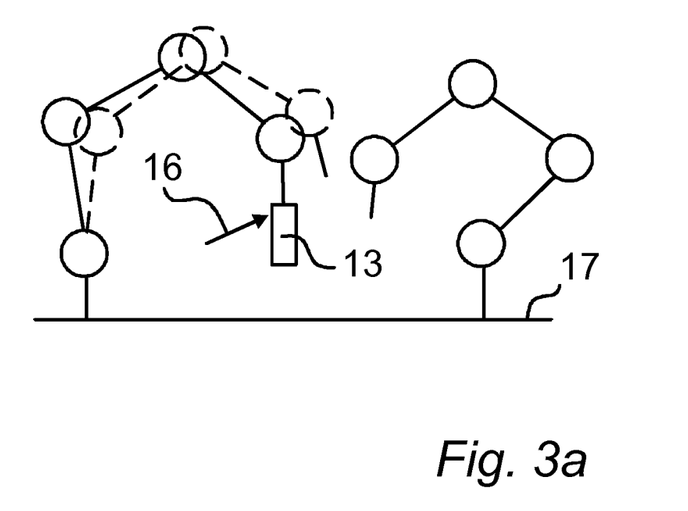
FIG. 3a shows a schematic illustration of two manipulator arms with no coupling according to the method, in a configuration of the first manipulator arm which elastically significantly deviates from its target position as a result of reaction forces.
Figure 3B:
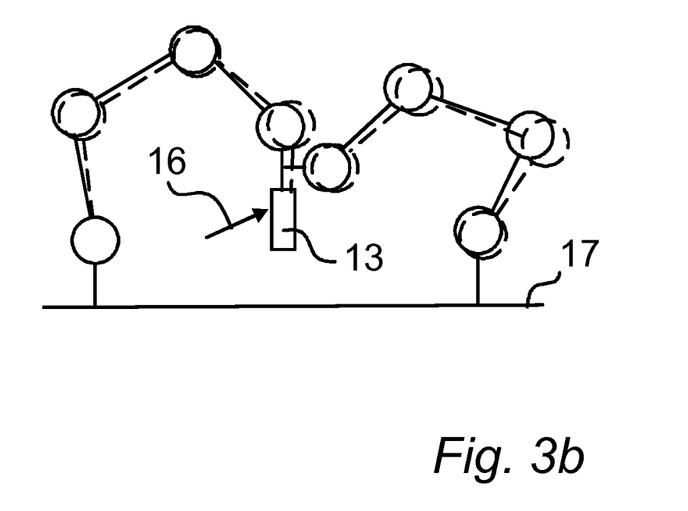
FIG. 3b shows a schematic illustration of two manipulator arms with a coupling according to the method, in a configuration of the first manipulator arm which only minimally deviates elastically from its target position as a result of reaction forces.

FIGS. 3a and 3b schematically illustrate an object 13 being worked on by means of another object 16. In this case, the second manipulator arm 1b completely or partially accepts reaction forces and/or reaction torques which are directed into the first manipulator arm 1a as a result of the work, via its link 12b of the second manipulator arm 1b coupled to the end link 12a of the first manipulator arm 1a. In this embodiment of the method, the object 13 can therefore be a workpiece which is held by the first manipulator arm 1a and is worked on by a tool which constitutes the other object 16. In this case, the first manipulator arm 1a, which grips the workpiece, can either merely hold the workpiece—for example on a work table 17, such that an external, separate tool can work on the workpiece—or the workpiece gripped by the manipulator arm 1a can approach, and/or be guided along, the tool, particularly the fixed tool. In FIG. 3a, the first manipulator arm 1a is shown in a first pose with a darkened form, which the manipulator arm 1a assumes when no work is done on the object 13. The first manipulator arm 1a is again shown in the lighter form as well, particularly in a pose which is altered as a result of reaction forces. Such an altered pose can occur, by way of example, as a result of unavoidable elasticities in the links 5a to 12a and/or joints 4a of the first manipulator arm 1a when forces are applied to the object 13 externally. The degree of the alteration of the pose is illustrated, solely to facilitate the illustration, to an exaggerated degree. At this point, if reaction forces and/or reaction torques are accepted according to the method by the second manipulator arm 1b, as shown in FIG. 3b, the alteration of the pose of the first manipulator arm 1a can be significantly reduced, if not even completely cancelled. An altered pose of the second manipulator arm 1b, resulting from reaction forces and/or reaction torques, as shown in FIG. 3b by the second manipulator arm 1b illustrated in a lighter form, is harmless as such, because the poses of the second manipulator arm 1b are not significant for the position and the orientation of the object 13. Rather the [position and orientation of the object 13] is determined by the first manipulator arm 1a, which holds the object 13.

Figure 4A:
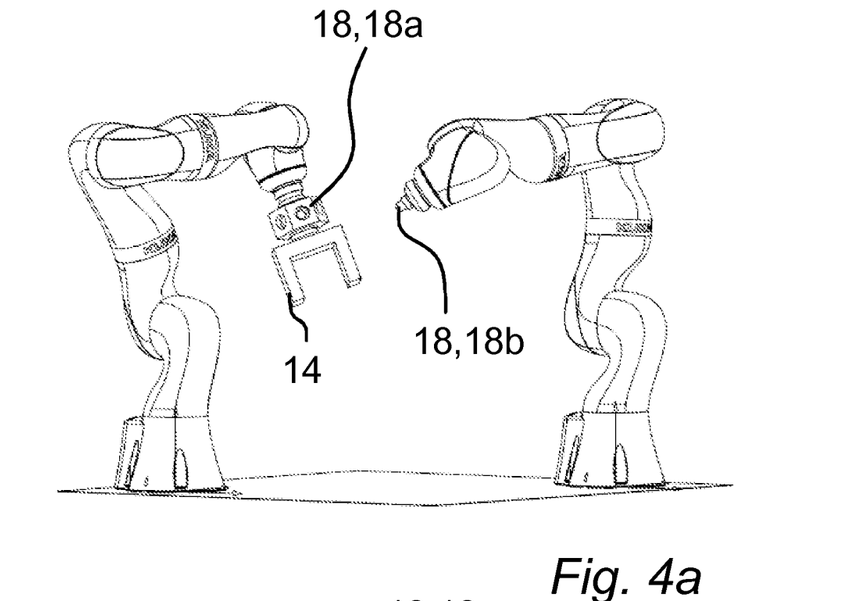
FIG. 4a shows a schematic illustration of two manipulator arms wherein the first manipulator arm has multiple coupling links on its end link, and the second manipulator arm carries a countercoupling link, in an uncoupled state.
Figure 4B:
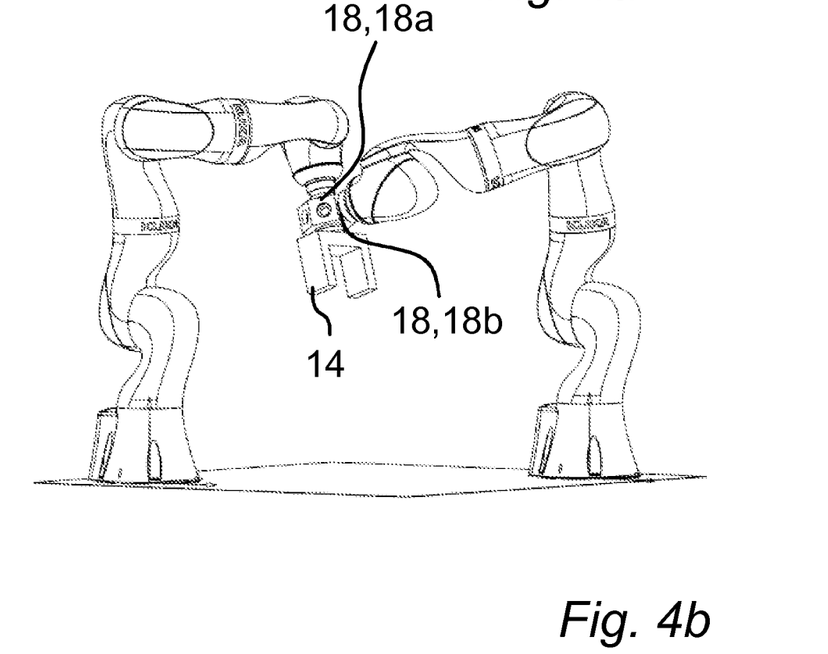
FIG. 4b shows a schematic illustration of the two manipulator arms according to FIG. 4a, wherein the first manipulator arm has multiple coupling links on its end link, and the second manipulator arm carries a countercoupling link, in an uncoupled state.

FIGS. 4a and 4b show, using one example, how a coupling of the end link 12b of the second manipulator arm 1b to the end link 12a of the first manipulator arm 1a can be realized by a coupling device 18 which has a first coupling link 18a which is fixed to the end link 12a of the first manipulator arm 1a, and a second counter-coupling link 18b which is fixed to the end link 12b of the second manipulator arm 1b, wherein said countercoupling link [18b] is coupled to the coupling link 18a in the coupled state. In the present embodiment, the end link 12a of the first manipulator arm 1a has multiple coupling links 18a—in particular six coupling links 18a. The six coupling links 18a are arranged on six flat outer surfaces of a hexagonal cylinder of the end link 12a of the first manipulator arm 1a, said surfaces being oriented in different spatial directions. In principle, the countercoupling link 18b of the second manipulator arm 1b can engage with a positive fit in each individual coupling link 18a, and lock in the same, in order to couple the second manipulator arm 1b to the first manipulator arm 1a, as is shown in FIG. 4b as an example.

Figure 5A:
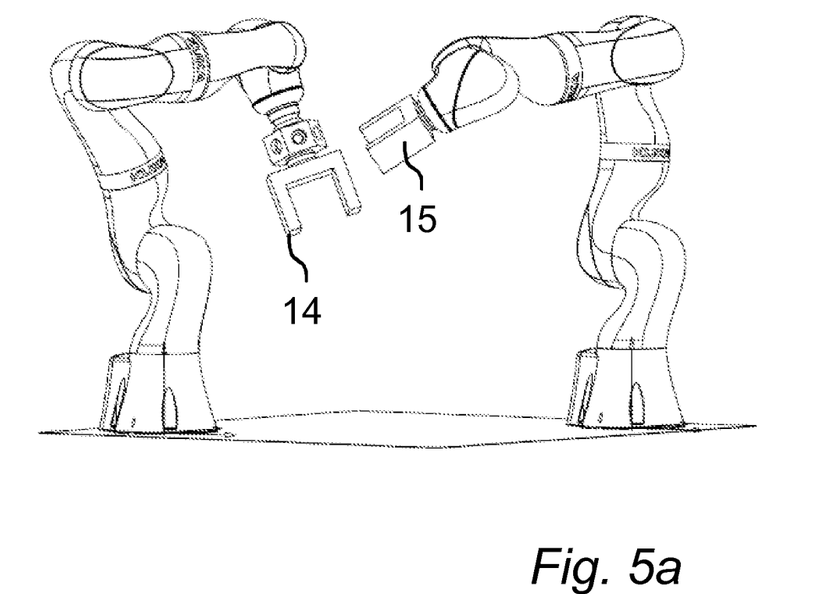
FIG. 5a shows a schematic illustration of two manipulator arms wherein the first manipulator arm has grip surfaces on its end link, and the second manipulator arm carries a gripper, in an uncoupled state.
Figure 5B:
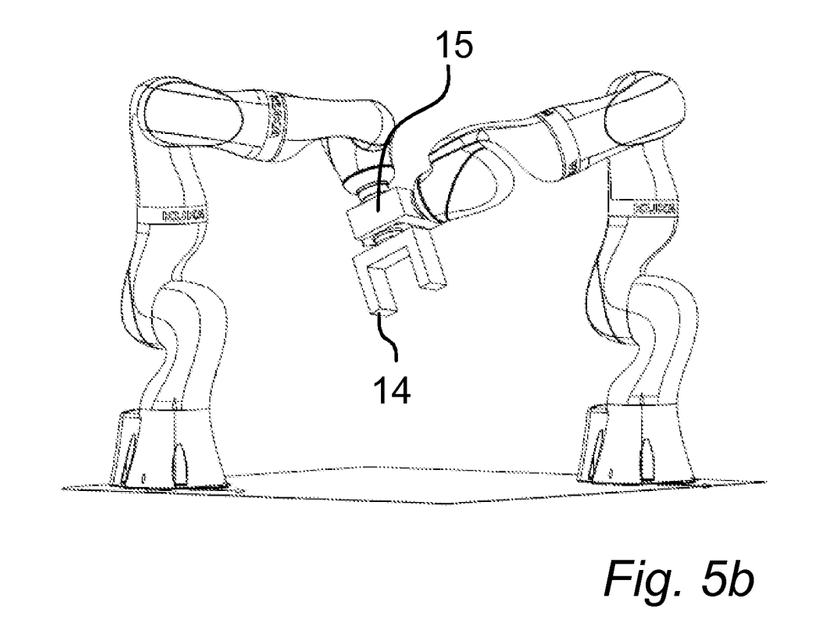
FIG. 5b shows a schematic illustration of the two manipulator arms according to FIG. 5a, wherein, in a coupled state, the gripper of the second manipulator arm engages with the grip surfaces of the first manipulator arm.

FIGS. 5a and 5b show a modification of FIGS. 4a and 4b, to the extent that the end link 12b of the second manipulator arm 1b is not coupled to the end link 12a of the first manipulator arm 1a by a coupling device 18, and particularly not by the countercoupling link 18b, but rather by its own gripping device—meaning the gripper 15—which is connected to the end link 12b of the second manipulator arm 1b and which grips the end link 12a of the first manipulator arm 1a on the hexagonal cylinder of the end link 12a when in the coupled state.

Figure 6A:
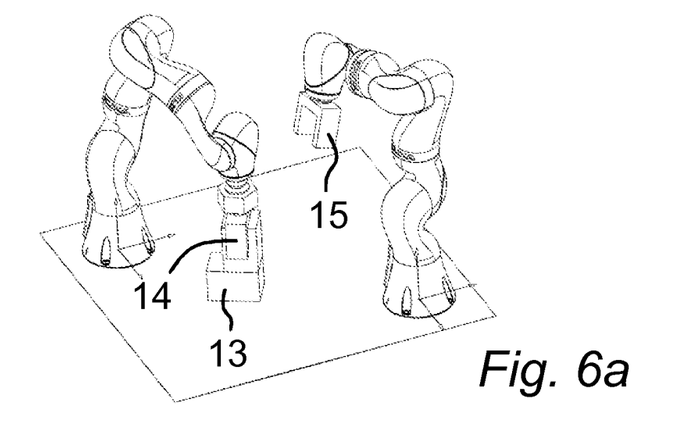
FIG. 6a shows a perspective view of the exemplary robotic workspace, with two manipulator arms, wherein the workpiece is difficult to lift using only the first manipulator arm.
Figure 6B:
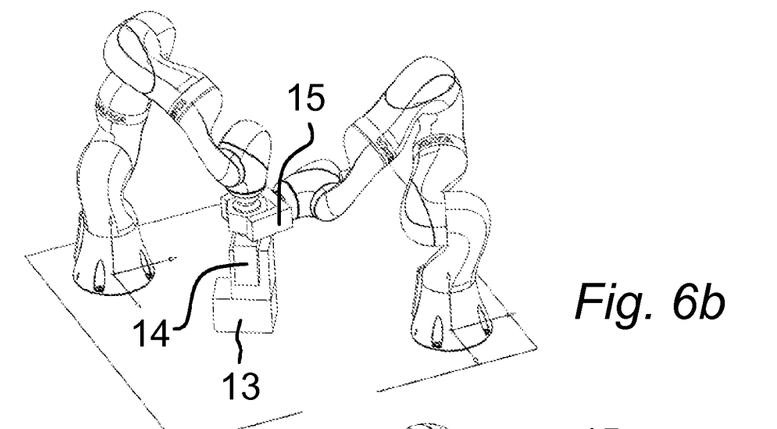
FIG. 6b shows a perspective view of the exemplary robotic workspace, with two manipulator arms, wherein the second manipulator arm supports the first manipulator arm by means of its gripper.
Figure 6C:
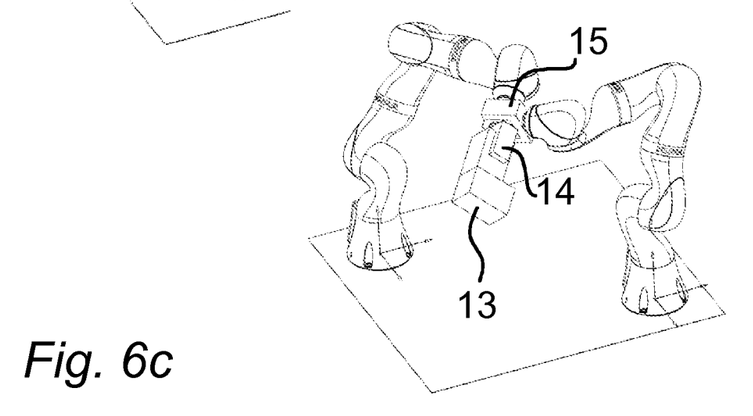
FIG. 6c shows a perspective view of the exemplary robotic workspace, with two manipulator arms, wherein the second manipulator arm supports the hoisting of the workpiece as a result of a coupling according to the method.

FIGS. 6a to 6c show an exemplary process corresponding to the method, having the steps of gripping the object 13, exclusively by means of the gripper 14 of the first manipulator arm 1a (FIG. 6a), the coupling of the gripper 15 of the second manipulator arm 1b to the end link 12a of the first manipulator arm 1a (FIG. 6b), and the hoisting of the object 13 by the first manipulator arm 1a and the second manipulator arm 1b, together, in such a manner that the second manipulator arm 1b accepts a part of the holding forces via its gripper 15 which is coupled to the end link 12a of the first manipulator arm 1a (FIG. 6c).

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A method for manipulating objects using a first industrial robot having a first manipulator arm and at least one second industrial robot having a respective second manipulator arm, each manipulator arm including multiple links arranged one after the other in series and connected by adjustable joints which can be adjusted under the control of at least one control device, wherein the first manipulator arm has a first end link and the second manipulator arm has a second end link, the method comprising:
    gripping an object with the first manipulator arm such that the object is connected with the first end link; and
    coupling a link of the second manipulator arm to one of the links of the first manipulator arm with a gripping device that is connected to the link of the second manipulator arm, the gripping device having opposing flat surface segments for gripping the link of the first manipulator arm on more than one surface;
    the first manipulator arm link having two flat surfaces, whereby the gripping device grips the link of the first manipulator arm by gripping the flat surfaces of the link of the first manipulator arm with the flat surface segments of the gripping device.

2. The method of claim 1, wherein the link of the second manipulator arm to be coupled with the link of the first manipulator arm is the second end link.

3. The method of claim 1, further comprising:
    hoisting the object using the first manipulator arm and the at least one second manipulator arm in such a manner that the at least one second manipulator arm provides a portion of the holding forces via the link that is coupled with one of the links of the first manipulator arm.

4. The method of claim 1, further comprising:
    working on the gripped object using another object, or working on another object using the gripped object; and
    absorbing with the at least one second manipulator arm at least one of reaction forces or reaction torques that are directed into the first manipulator arm as a result of the work, via the link of the second manipulator arm coupled with one of the links of the first manipulator arm.

5. The method of claim 1, further comprising:
    controlling the joints of the first manipulator arm with the at least one control device based on measured values regarding the positions of the joints of the first manipulator arm and the positions of the joints of the at least one second manipulator arm.

6. An industrial robot, comprising:
    a control device;
    a first manipulator arm having multiple links arranged one after the other and connected by adjustable joints that are adjustable under the control of the control device; and
    a gripping device connected to at least one of the links of the first manipulator arm, the gripping device having opposing flat surface segments for coupling the link of the first manipulator arm to a link of a second manipulator arm of a second robot, the second manipulator arm link having at least two flat surfaces, the gripping device gripping two flat surfaces of the second manipulator arm link from opposite sides.

7. The industrial robot of claim 6, wherein two or more links of the first manipulator arm each have at least one or more of coupling links or counter-coupling links.

8. The industrial robot of claim 7, wherein one link of the first manipulator arm has at least two or more coupling links, two or more counter-coupling links, or at least one coupling link and one counter-coupling link connected to the link and oriented in different spatial directions.

9. A method for manipulating objects using a first industrial robot having a first manipulator arm and at least one second industrial robot having a respective second manipulator arm, each manipulator arm including multiple links arranged one after the other in series and connected by adjustable joints which can be adjusted under the control of at least one control device, wherein the first manipulator arm has a first end link and the second manipulator arm has a second end link, the method comprising:
    gripping an object with the first manipulator arm such that the object is connected with the first end link; and
    coupling a link of the second manipulator arm to one of the links of the first manipulator arm by gripping the link of the first manipulator arm with a pincher gripper that is connected to the link of the second manipulator arm.

* * * * *